(12) United States Patent
Choe et al.

(10) Patent No.: US 9,163,170 B2
(45) Date of Patent: Oct. 20, 2015

(54) EPOXY RESIN COMPOSITION INCLUDING SILICA AND CORE-SHELL POLYMER PARTICLES

(71) Applicant: EP Chemical Co., Ltd, Busan (KR)

(72) Inventors: Young-Son Choe, Busan (KR); Woo-Jin Jung, Busan (KR)

(73) Assignee: EP CHEMICAL CO., LTD, Busan (KR)

( * ) Notice: Subject to any disclaimer, the term of this patent is extended or adjusted under 35 U.S.C. 154(b) by 189 days.

(21) Appl. No.: 13/915,633

(22) Filed: Jun. 12, 2013

(65) Prior Publication Data

US 2013/0337165 A1    Dec. 19, 2013

(30) Foreign Application Priority Data

Jun. 14, 2012   (KR) .................. 10-2012-0063834

(51) Int. Cl.
*C08L 83/00*    (2006.01)
*C09J 163/00*   (2006.01)
*C09J 121/00*   (2006.01)

(52) U.S. Cl.
CPC .............. *C09J 163/00* (2013.01); *C09J 121/00* (2013.01)

(58) Field of Classification Search
CPC .............................. C09J 121/00; C09J 163/00
USPC ................................................. 523/201, 466
See application file for complete search history.

(56) References Cited

U.S. PATENT DOCUMENTS

| | | | |
|---|---|---|---|
| 4,728,737 A | 3/1988 | Goel | |
| 4,916,187 A | 4/1990 | Goel | |
| 5,629,380 A | 5/1997 | Baldwin et al. | |
| 6,577,971 B2 | 6/2003 | Aitken et al. | |
| 2007/0112101 A1* | 5/2007 | Choi et al. | ........... 523/442 |

FOREIGN PATENT DOCUMENTS

| | | |
|---|---|---|
| KR | 10-2003-0060916 A | 7/2003 |
| KR | 10-2008-0030579 A | 4/2008 |
| KR | 10-2011-0137318 A | 12/2011 |

\* cited by examiner

*Primary Examiner* — Xiao Zhao
(74) *Attorney, Agent, or Firm* — Revolution IP, PLLC

(57) ABSTRACT

Disclosed is an impact resistant adhesive composition including silica and core-shell polymer particles. The impact resistant adhesive composition includes: (a) a first component including an epoxy resin and a polymeric dispersant, or an epoxy resin-polymeric dispersant prepolymer; (b) a second component including silica and core-shell polymer particles having a particle diameter of 20 to 250 nm; and (c) a third component including a curing agent and an additive mixture. The polymeric dispersant is a flexible polyether monoamine or polyether diamine which includes a mixed form of a lipophilic alkyl oxide chain and a hydrophilic ethylene oxide chain in the main chain, and has a weight average molecular weight of 500 to 4,000.

11 Claims, No Drawings

EPOXY RESIN COMPOSITION INCLUDING SILICA AND CORE-SHELL POLYMER PARTICLES

CROSS REFERENCE TO PRIOR APPLICATIONS

This application claims priority under 35 U.S.C. §119 to Korean Patent Application No. 10-2012-0063834, filed on Jun. 14, 2012, which is hereby incorporated by reference in its entirety.

BACKGROUND OF THE INVENTION

1. Field of the Invention

The present invention relates to an epoxy resin composition including silica and core-shell polymer particles. More specifically, the present invention relates to an epoxy resin composition including silica and core-shell polymer particles in which the silica and the core-shell polymer particles whose polarities are different from each other are uniformly dispersed by a polymeric dispersant having a structure in which flexible lipophilic and hydrophilic chains located in the main chain, or an epoxy resin-polymeric dispersant prepolymer, and the polymeric dispersant participates in a curing reaction, achieving improved impact resistance.

2. Description of the Related Art

Epoxy adhesive compositions are reactive adhesive compositions including an epoxy resin, a curing agent, and usually a latent accelerator. Upon heating, the epoxy groups of the epoxy resin react with the curing agent linking epoxy resin compounds by a polyaddition reaction to obtain a cured product.

Such a cured product is known to have good mechanical properties and chemical resistance. Due to these advantages, epoxy adhesive compositions are suitable for the bonding of transportation machinery parts and machine parts. Adhesives for use in such applications are called structural adhesives. Generally, heat-curable epoxy adhesives are used as structural adhesives.

Two-component adhesives as heat-curable epoxy adhesives include two separate components, i.e. a first component including an epoxy resin and a second component includes an epoxy reactive compound. Many two-component epoxy adhesives have been disclosed as structural adhesives for general uses. The two components are previously mixed and undergo thermal curing when a latent curing agent is used.

U.S. Pat. No. 4,728,737 discloses a two-component structural adhesive including an epoxy resin component and a curing agent component.

U.S. Pat. No. 4,916,187 concerns a two-component epoxy resin adhesive composition consisting of a first polyepoxide component and a second curing component including a finely dispersed solid salt of a polyamine and a polyphenol in a liquid adduct.

U.S. Pat. No. 5,629,380 discloses a two-component epoxy adhesive including a first component and a second component wherein the first component includes an epoxy catalyst and an amine curing agent, and the second component includes an epoxy resin having a functionality of more than 1.

U.S. Pat. No. 6,577,971 concerns a two-component epoxy adhesive composition including a first component and a second component wherein the first component includes an epoxy resin and a silane coupling agent, and the second component includes an aliphatic amine and a polyamine.

The above patent documents disclose technologies relating to bicomponent-based epoxy adhesive compositions. However, to our knowledge, there have been no technologies regarding epoxy resin compositions in which silica and core-shell polymer particles whose polarities are different from each other are uniformly dispersed by a polymeric dispersant having lipophilic and hydrophilic chains in the main chain, or an epoxy resin-polymeric dispersant prepolymer, no flowability occurs even at a low viscosity after application to an adherend, and the polymeric dispersant participates in a curing reaction, achieving improved impact resistance.

SUMMARY OF THE INVENTION

Thus, it is an object of the present invention to provide an adhesive composition in which a flexible polymeric dispersant having lipophilic and hydrophilic chains in the main chain is appropriately selected and introduced to uniformly disperse silica and core-shell polymer particles whose polarities are different from each other, and the flexible polymeric dispersant or an epoxy resin-polymeric dispersant prepolymer participates in a curing reaction upon heat curing, achieving improved impact resistance.

It is another object of the present invention to provide a method for preparing the impact resistant adhesive composition.

It is another object of the present invention to provide a method of using the impact resistant adhesive composition.

It is another object of the present invention to provide a reactive reagent including the impact resistant adhesive composition.

It is still another object of the present invention to provide an adhesive tape including the impact resistant adhesive composition.

According to an aspect of the present invention, there is provided an impact resistant adhesive composition including:

(a) a first component including an epoxy resin and a polymeric dispersant, or an epoxy resin-polymeric dispersant prepolymer;

(b) a second component including silica and core-shell polymer particles having a particle diameter of 20 to 250 nm; and (c) a third component including a curing agent and an additive mixture, wherein the polymeric dispersant is a flexible polyether monoamine or polyether diamine including a mixed form of a lipophilic alkyl oxide chain and a hydrophilic ethylene oxide chain in the main chain, and having a weight average molecular weight of 500 to 4,000.

According to another aspect of the present invention, there is provided a method for preparing an impact resistant adhesive composition, including:

(a) preparing a first component including an epoxy resin and a polymeric dispersant, or an epoxy resin-polymeric dispersant prepolymer;

(b) mixing the first component with a second component including silica and core-shell polymer particles having a particle diameter of 20 to 250 nm, and dispersing the silica and the core-shell polymer particles; and (c) cooling the dispersion, and mixing the dispersion with a third component including a curing agent and an additive mixture, wherein the polymeric dispersant is a flexible polyether monoamine or polyether diamine including a mixed form of a lipophilic alkyl oxide chain and a hydrophilic ethylene oxide chain in the main chain, and having a weight average molecular weight of 500 to 4,000.

According to another aspect of the present invention, there is provided a method of using an impact resistant adhesive composition including silica and core-shell polymer particles by applying the impact resistant adhesive composition to the surface of a structure, and curing the impact resistant adhesive composition at a temperature of 120 to 180° C. to bond the impact resistant adhesive composition to the surface of the structure.

According to another aspect of the present invention, there is provided a reactive reagent including the impact resistant adhesive composition.

According to yet another aspect of the present invention, there is provided an adhesive tape including the impact resistant adhesive composition.

In the composition of the present invention, silica and core-shell polymer particles having different polarities can be uniformly dispersed by an appropriately selected flexible polymeric dispersant having lipophilic and hydrophilic chains in the main chain. In addition, the composition of the present invention is not flowable even at a relatively low viscosity due to its excellent viscosity characteristics resulting from interactions between the polymeric dispersant and the particles after application to an adherend. Furthermore, the polymeric dispersant participates in a curing reaction, and as a result, the chain structure thereof is imparted with flexibility upon heat curing, achieving improved impact resistance of the composition.

DETAILED DESCRIPTION OF THE INVENTION

The present invention will now be described in more detail.

In one aspect, the present invention provides an impact resistant adhesive composition. Specifically, the impact resistant adhesive composition includes: (a) a first component including an epoxy resin and a polymeric dispersant, or an epoxy resin-polymeric dispersant prepolymer; (b) a second component including silica and core-shell polymer particles having a particle diameter of 20 to 250 nm; and (c) a third component including a curing agent and an additive mixture. The polymeric dispersant is a flexible polyether monoamine or polyether diamine which includes a mixed form of a lipophilic alkyl oxide chain and a hydrophilic ethylene oxide chain in the main chain, and has a weight average molecular weight of 500 to 4,000.

The polymeric dispersant participates in a curing reaction and uniformly disperses the silica and the core-shell polymer particles whose polarities are different from each other, achieving improved impact resistance of the adhesive composition. Specifically, the polymeric dispersant may be a compound represented by Formula 1:

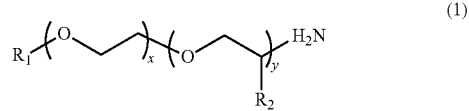

(1)

wherein $R_1$ is $CH_3$, COOH or $NH_2$, $R_2$ is $CH_3$, COOH, OH or $CH_2CH_3$, and x and y are each independently an integer from 5 to 100.

Preferably, the compound of Formula 1 has a weight average molecular weight of 500 to 4,000. If the weight average molecular weight of the compound of Formula 1 is less than 500, sufficient lipophilic and hydrophilic functions are not exhibited, undesirably failing to disperse the particles having different polarities. Meanwhile, if the weight average molecular weight of the compound of Formula 1 exceeds 4,000, the mechanical properties of the composition deteriorate. The ratio x:y in Formula 1 is preferably from 3:10 to 10:3.

The content of the flexible polymeric dispersant having lipophilic and hydrophilic chains in the main chain or the epoxy resin-polymeric dispersant prepolymer is preferably from 5 to 30% by weight, based on the total weight of the composition. If the content is less than 5% by weight, the effect of dispersing the particles is negligible. Meanwhile, if the content exceeds 30% by weight, the mechanical properties of the composition deteriorate.

The epoxy resin used in the composition of the present invention is liquid and solid bisphenol A, bisphenol F, epichlorohydrin, or a mixture thereof. Preferably, the epoxy resin has an epoxy equivalent weight of 130 to 800. The content of the epoxy resin is preferably from 20 to 70% by weight, based on the total weight of the composition. The presence of the epoxy resin in an amount of less than 20% by weight undesirably causes deterioration in the mechanical properties of the composition. Meanwhile, the presence of the epoxy resin in an amount exceeding 70% by weight undesirably causes poor impact resistance of the composition.

The second component including silica and core-shell polymer particles having a particle diameter of 20 to 250 nm is uniformly dispersed by the polymeric dispersant and serves to impart impact resistance to the adhesive composition. Accordingly, the content of the second component is determined taking into consideration the impact resistance of the composition. For example, the silica and the core-shell polymer particles may be used in amounts of 2 to 15% by weight and 5 to 35% by weight, respectively. The single use of the silica or the core-shell polymer particles tends to improve the impact resistance of the composition than the combined use of the silica and the core-shell polymer particles. Accordingly, the presence of the second component in an amount of less than 2% by weight or exceeding 35% by weight with respect to the total weight of the composition undesirably leads to poor impact resistance of the composition at low temperature.

The additive mixture may further include a thermally active latent curing accelerator. Examples of such thermally active latent curing accelerators include dicyandiamide and imidazole compounds. More preferably, the thermally active latent curing accelerator is selected from silane coupling agents, phthalic reactive moisture-proofing agents, flowability modifiers, and mixtures thereof. A representative example of the phthalic reactive moisture-proofing agents may be diallyl phthalate (DAP) represented by Formula 2:

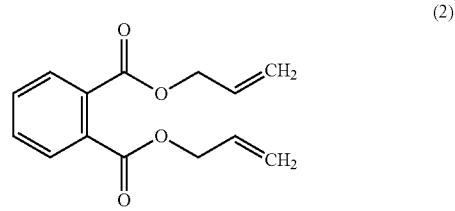 [SMILES: C=CCOC(=O)c1ccccc1C(=O)OCC=C]

(2)

The phthalic reactive moisture-proofing agent is preferably present in an amount of less than 5% by weight, based on the total weight of the composition. The presence of the phthalic reactive moisture-proofing agent as the curing accelerator in an amount exceeding 5% by weight undesirably leads to deterioration in the mechanical properties of the composition.

In another aspect, the present invention provides a method for preparing an impact resistant adhesive composition. Specifically, the method includes: (a) preparing a first component including an epoxy resin and a polymeric dispersant, or an epoxy resin-polymeric dispersant prepolymer; (b) mixing the first component with a second component including silica and core-shell polymer particles having a particle diameter of 20 to 250 nm, and dispersing the silica and the core-shell polymer particles; and (c) cooling the dispersion, and mixing the dispersion with a third component including a curing agent and an additive mixture. The polymeric dispersant is a flexible polyether monoamine or polyether diamine which includes a mixed form of a lipophilic alkyl oxide chain and a hydrophilic ethylene oxide chain in the main chain, and has a weight average molecular weight of 500 to 4,000.

The flexible polymeric dispersant having lipophilic and hydrophilic chains in the main chain is preferably the compound represented by Formula 1, which has been specifically described above. The method of the present invention enables the preparation of an impact resistant adhesive composition, which has been described above.

In the step of preparing the first component, the epoxy resin-polymeric dispersant prepolymer may be used instead of the epoxy resin and the flexible polymeric dispersant having lipophilic and hydrophilic chains in the main chain. The epoxy resin-polymeric dispersant prepolymer has the same dispersion performance as the flexible polymeric dispersant and is effective in inducing the polymeric dispersant to participate in a curing reaction. The epoxy resin-polymeric dispersant prepolymer may have a linear structure in which the polymeric dispersant is attached to the main chain of the epoxy resin without being cross-linked. The epoxy resin-polymeric dispersant prepolymer may be synthesized by mixing 5 to 30% by weight of the polymeric dispersant with 20 to 70% of the epoxy resin, and allowing the mixture to react in air at ambient pressure and a temperature of 100 to 130° C. for 1 to 3 hours. The prepolymer thus synthesized has a linear flexible main chain, experiences no substantial increase in viscosity, and can also effectively participate in a curing reaction because the main chain is replaced by an epoxy group at one end thereof.

Alternatively, the epoxy-polymer prepolymer may be synthesized by mixing the epoxy resin, the flexible polymeric dispersant having lipophilic and hydrophilic chains in the main chain, silica, and the core-shell polymer particles, dispersing the mixture using a high-speed agitator, and allowing the dispersion to react in air at ambient pressure and a temperature of 100 to 130° C. for 1 to 3 hours. As a result of the reaction, the epoxy-polymer prepolymer is present in the mixture. In this case, the epoxy-polymer prepolymer has a linear flexible main chain, like the epoxy-polymer prepolymer, experiences no substantial increase in viscosity, and effectively participates in a curing reaction because the main chain is replaced by an epoxy group at one end thereof. This method makes the preparation procedure simpler, which is desirable.

Preferably, the adhesive composition is prepared by mixing the first component with silica and the core-shell polymer particles, dispersing the mixture, mixing the dispersion with the curing agent and the additive mixture, followed by preliminary curing at 100 to 150° C. In this case, the polymeric dispersant included in the first component participates in the curing reaction, contributing to further improvement of impact resistance.

In another aspect, the present invention provides a method of using the impact resistant adhesive composition including silica and core-shell polymer particles dispersed by a flexible polymeric dispersant having lipophilic and hydrophilic chains in the main chain, by applying the impact resistant adhesive composition to the surface of a structure, and curing the impact resistant adhesive composition at a temperature of 120 to 180° C. to bond the impact resistant adhesive composition to the surface of the structure.

In yet another aspect, the present invention provides a product including the impact resistant adhesive composition including silica and core-shell polymer particles dispersed by a flexible polymeric dispersant having lipophilic and hydrophilic chains in the main chain. The impact resistant adhesive composition can be used in various applications, such as paste compositions, reactive reagents, and adhesive tapes.

EXAMPLES

Preparation of Epoxy Resin-Polymeric Dispersant Prepolymer 100 g of a liquid epoxy resin (bisphenol A type) and 20 g of a polyether monoamine (Surfonamine, Huntsman Corporation) as a polymeric dispersant were mixed in a 1 L SUS container. The lipophilic or hydrophilic properties of the polymeric dispersant can be adjusted depending on the ratio of ethylene oxide/propylene oxide moieties in the main chain. The mixture was allowed to react with slow stirring at 100° C. for 2 hrs. After completion of the reaction, the reaction mixture was slowly cooled to room temperature.

Epoxy Adhesive Blend 1 Including Silica and Core-Shell Polymer Particles 500 g of the epoxy resin-polymeric dispersant prepolymer was placed in a 1.5 L SUS container, and then 20 g of silica particles and 100 g of core-shell rubber particles (LG Chem. or Rohm & Haas) were slowly added to the container. The mixture was dispersed at a high speed for 2 hrs. The container was cooled using a cooling jacket with stirring to prevent the temperature from exceeding 70° C. The reaction mixture was slowly allowed to cool to room temperature. To the reaction mixture were added sequentially 2.5 g of silane, 60 g of DICY, and 5 g of an imidazole accelerator, followed by mixing for 30 min.

Epoxy Adhesive Blend 2 Including Silica and Core-Shell Polymer Particles 500 g of a liquid epoxy resin (bisphenol A type) and 100 g of a polyether monoamine (Surfonamine, Huntsman Corporation) as a polymeric dispersant were mixed in a 1.5 L SUS container. The lipophilic or hydrophilic properties of the polymeric dispersant can be adjusted depending on the ratio of ethylene oxide/propylene oxide moieties in the main chain. 20 g of silica particles and 100 g of core-shell rubber particles (LG Chem. or Rohm & Haas) were slowly added to the container. The mixture was dispersed at a high speed for 2 hrs. Thereafter, the dispersion was allowed to react with slow stirring at 100° C. for 2 hrs. After completion of the reaction, the container was cooled using a cooling jacket. To the reaction mixture were added sequentially 2.5 g of silane, 60 g of DICY, and 5 g of an imidazole accelerator, followed by mixing for 30 min.

Evaluations and Results

Each of the adhesive blends was uniformly applied to the surface of a specimen at room temperature. The adhesive blend was heat cured in an electric oven at 160° C. for 30 min or at 120° C. for 60 min. The curing temperature was controllable. The adhesive blend was cured for a longer time at a lower temperature.

Impact-Peel Strength (N/mm)

Test pieces were prepared from a steel plate. The tensile shear strengths of the compositions were measured at room temperature. The impact-peel strengths of the compositions were measured at room temperature (23° C.) and −40° C. according to ISO 11343. The results are shown in Table 1.

T-Peel Strength (kg/25 mm)

After standing the specimens at room temperature (23° C.) for 4 min, the T-peel strengths were measured according to ASTM D1876. The results are shown in Table 1.

Lap Shear Strength (MPa)

After standing the specimens at room temperature (23° C.) for 16 min, the lap shear strengths of the adhesive blends were measured according to ASTM D1002. The results are shown in Table 1.

TABLE 1

| Physical properties | Temperature | Adhesive blend 1 | Adhesive blend 2 |
|---|---|---|---|
| Impact peel strength (N/mm) | 23° C. | 30 | 30 |
|  | −40° C. | 18 | 19 |
| T-Peel strength (Kg/25 mm) | 23° C. | 31 | 30 |
| Lap shear strength (MPa) | 23° C. | 28 | 28 |

As can be seen from the results in Table 1, the impact resistant adhesive compositions possessed high shear strengths and high impact peel strengths.

What is claimed is:
1. An impact resistant adhesive composition comprising:
   (a) a first component comprising an epoxy resin and a polymeric dispersant, or an epoxy resin-polymeric dispersant prepolymer;
   (b) a second component comprising silica and core-shell polymer particles having a particle diameter of 20 to 250 nm; and
   (c) a third component comprising a curing agent and an additive mixture, wherein the polymeric dispersant is a flexible polyether monoamine or polyether diamine comprising a mixed form of a lipophilic alkyl oxide chain and a hydrophilic ethylene oxide chain in the main chain, and having a weight average molecular weight of 500 to 4,000.
2. The impact resistant adhesive composition according to claim 1, wherein the polymeric dispersant is a compound represented by Formula 1:

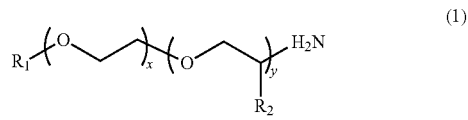

wherein $R_1$ is $CH_3$, COOH or $NH_2$, $R_2$ is $CH_3$, COOH, OH or $CH_2CH_3$, and x and y are each independently an integer from 5 to 100.

3. The impact resistant adhesive composition according to claim 2, wherein the compound of Formula 1 has a weight average molecular weight of 500 to 4,000.

4. The impact resistant adhesive composition according to claim 2, wherein the ratio x:y in Formula 1 is from 3:10 to 10:3.

5. The impact resistant adhesive composition according to claim 1, wherein the flexible polymeric dispersant or the epoxy resin-polymeric dispersant prepolymer of the first component is present in an amount of 5 to 30% by weight, based on the total weight of the composition.

6. The impact resistant adhesive composition according to claim 1, wherein the epoxy resin is liquid and solid bisphenol A, bisphenol F, epichlorohydrin or a mixture thereof, and has an epoxy equivalent weight of 130 to 800.

7. The impact resistant adhesive composition according to claim 1, wherein the epoxy resin is present in an amount of 20 to 70% by weight, based on the total weight of the composition.

8. The impact resistant adhesive composition according to claim 1, wherein the second component is present in an amount of 2 to 35% by weight, based on the total weight of the composition.

9. The impact resistant adhesive composition according to claim 1, wherein the third component further comprises a dicyandiamide or imidazole compound as a thermally active latent curing accelerator.

10. The impact resistant adhesive composition according to claim 9, wherein the curing accelerator is selected from a silane coupling agent, a flowability modifier, a phthalic reactive moisture-proofing agent, and mixtures thereof.

11. The impact resistant adhesive composition according to claim 10, wherein the phthalic reactive moisture-proofing agent is represented by Formula 2:

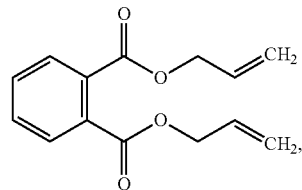

and is present in an amount of less than 5% by weight, based on the total weight of the composition.

* * * * *